ized in a host vehicle receiving vehicle attribute

(12) United States Patent
Thompson et al.

(10) Patent No.: US 9,830,814 B2
(45) Date of Patent: Nov. 28, 2017

(54) SYSTEM AND METHOD FOR TRANSMITTING DETECTED OBJECT ATTRIBUTES OVER A DEDICATED SHORT RANGE COMMUNICATION SYSTEM

(71) Applicant: Dura Operating, LLC, Auburn Hills, MI (US)

(72) Inventors: Aaron Evans Thompson, Grand Blanc, MI (US); Donald Raymond Gignac, Waterford, MI (US); Danish Uzair Siddiqui, Rochester Hills, MI (US); Rajashekhar Patil, Ypsilanti, MI (US); Gordon M. Thomas, Beverly Hills, MI (US)

(73) Assignee: DURA OPERATING, LLC, Auburn Hills, MI (US)

( * ) Notice: Subject to any disclaimer, the term of this patent is extended or adjusted under 35 U.S.C. 154(b) by 19 days.

(21) Appl. No.: 15/198,600

(22) Filed: Jun. 30, 2016

(65) Prior Publication Data

US 2017/0025015 A1   Jan. 26, 2017

Related U.S. Application Data

(60) Provisional application No. 62/194,370, filed on Jul. 20, 2015.

(51) Int. Cl.
*G08G 1/09* (2006.01)
*G08G 1/04* (2006.01)
(Continued)

(52) U.S. Cl.
CPC ............... *G08G 1/04* (2013.01); *B60Q 9/008* (2013.01); *G01S 17/026* (2013.01); *G01S 17/06* (2013.01);
(Continued)

(58) Field of Classification Search
None
See application file for complete search history.

(56) References Cited

U.S. PATENT DOCUMENTS 5,680,122 A * 10/1997 Mio ..................... G05D 1/0246
180/167
6,356,820 B1 * 3/2002 Hashimoto .............. G08G 1/22
180/167

(Continued)

*Primary Examiner* — Curtis King
(74) *Attorney, Agent, or Firm* — Robert E. Ford; Steven L. Crane; Raymond J. Vivacqua

(57) ABSTRACT

A motor vehicle system for generating and transmitting detected object attributes includes a communication system module positioned in a host vehicle receiving vehicle attribute data from a target vehicle and a sensed vehicle and preparing a fused object attribute data for transmission to the target vehicle. A vehicle track data sub-module in communication with the communication system module independently tracks the sensed vehicle and the target vehicle. An object detection and classification system module having a 3D object detection module identifies a vehicle type defined at least by a vehicle size and generates an object attribute data. A target fusion module receives the object attribute data from the object detection and classification system module, fuses the object attribute data with the vehicle attribute data to create the fused object attribute data, and forwards the fused object attribute data to the communication system module for transmission.

18 Claims, 3 Drawing Sheets

(51) Int. Cl.
  *G08G 1/0967*   (2006.01)
  *G08G 1/16*     (2006.01)
  *G06K 9/62*     (2006.01)
  *G06K 9/00*     (2006.01)
  *B60Q 9/00*     (2006.01)
  *G01S 17/02*    (2006.01)
  *G01S 17/06*    (2006.01)
  *G01S 17/66*    (2006.01)
  *G08G 1/01*     (2006.01)
  *G08G 1/056*    (2006.01)
  *H04W 4/00*     (2009.01)
  *H04W 84/00*    (2009.01)
  *G01S 13/93*    (2006.01)

(52) U.S. Cl.
  CPC .......... *G01S 17/66* (2013.01); *G06K 9/00805* (2013.01); *G06K 9/6292* (2013.01); *G08G 1/0108* (2013.01); *G08G 1/056* (2013.01); *G08G 1/096716* (2013.01); *G08G 1/096791* (2013.01); *G08G 1/162* (2013.01); *G08G 1/165* (2013.01); *G08G 1/166* (2013.01); *H04W 4/008* (2013.01); *G01S 2013/936* (2013.01); *H04W 84/005* (2013.01)

(56) References Cited

U.S. PATENT DOCUMENTS

| | | | | |
|---|---|---|---|---|
| 7,797,108 B2* | 9/2010 | Grimm | ................ | G08G 1/168 340/435 |
| 8,199,046 B2* | 6/2012 | Nanami | ................ | G01S 13/931 340/425.5 |
| 8,229,663 B2* | 7/2012 | Zeng | ................ | B60W 40/02 180/168 |
| 8,447,474 B2* | 5/2013 | Breed | ................ | B60R 19/205 180/169 |
| 9,002,631 B2* | 4/2015 | Taguchi | ................ | B60W 40/04 340/435 |
| 2006/0291482 A1* | 12/2006 | Evans | ................ | H04W 40/246 370/401 |
| 2007/0054685 A1* | 3/2007 | Kellum | ................ | G01S 13/931 455/517 |
| 2007/0096885 A1* | 5/2007 | Cheng | ................ | B60W 40/04 340/435 |
| 2007/0179701 A1* | 8/2007 | Hamilton | ................ | G01C 21/00 701/36 |
| 2007/0276600 A1* | 11/2007 | King | ................ | G08G 1/042 701/301 |
| 2008/0195284 A1* | 8/2008 | Hammadou | ................ | B60Q 9/006 701/45 |
| 2010/0060485 A1* | 3/2010 | Kim | ................ | G08G 1/143 340/932.2 |
| 2010/0214085 A1* | 8/2010 | Avery | ................ | G08G 1/161 340/435 |
| 2011/0169663 A1* | 7/2011 | Stahlin | ................ | G08G 1/163 340/933 |
| 2012/0035846 A1* | 2/2012 | Sakamoto | ................ | B60T 8/17558 701/301 |
| 2013/0116915 A1* | 5/2013 | Ferreira | ................ | G08G 1/163 701/117 |
| 2013/0181823 A1* | 7/2013 | Stahlin | ................ | B60K 35/00 340/436 |
| 2013/0222127 A1* | 8/2013 | Ray Avalani | ................ | B60Q 9/008 340/436 |
| 2014/0009275 A1* | 1/2014 | Bowers | ................ | B60Q 1/00 340/436 |
| 2014/0063197 A1* | 3/2014 | Yamamoto | ................ | G08G 1/166 348/46 |
| 2014/0091911 A1* | 4/2014 | Ho | ................ | G06K 7/01 340/10.42 |
| 2014/0129075 A1* | 5/2014 | Carleton | ................ | B60W 30/00 701/27 |
| 2014/0164582 A1* | 6/2014 | Dawson | ................ | H04W 48/18 709/221 |
| 2015/0035662 A1* | 2/2015 | Bowers | ................ | B60Q 9/008 340/436 |
| 2016/0189547 A1* | 6/2016 | Hsu | ................ | G08G 1/166 701/70 |
| 2016/0295589 A1* | 10/2016 | Nikopour | ................ | H04W 4/023 |
| 2016/0358477 A1* | 12/2016 | Ansari | ................ | G08G 1/167 |

* cited by examiner

SYSTEM AND METHOD FOR TRANSMITTING DETECTED OBJECT ATTRIBUTES OVER A DEDICATED SHORT RANGE COMMUNICATION SYSTEM

CROSS REFERENCE TO RELATED APPLICATIONS

The present application claims the benefit of U.S. Provisional Patent application No. 62/194,370, filed on Jul. 20, 2015, the subject matter of which is incorporated herein by reference.

FIELD

The invention relates generally to vehicle automated tracking and notification systems for motor vehicles.

BACKGROUND

The statements in this section merely provide background information related to the present disclosure and may or may not constitute prior art.

Motor vehicle sensing systems are known which can identify to a host vehicle other proximate motor vehicles and warn the driver of the host vehicle of the other vehicle's movements which may intersect the driving path of the host vehicle. Other motor vehicle sensing systems are known which can utilize the data received from the above noted sensing system and institute changes such as to reduce a host vehicle driving speed, apply brakes, provide audio and visual warning signals, and the like to the host vehicle driver. Known systems may utilize camera systems that receive visual data related to the other vehicles and a computer system to perform calculations and generate vehicle command instructions, and LIDAR (light detection and ranging) which relies on laser light to illuminate one or more target vehicles. Other known systems include the vehicle-to-vehicle (V2V) system which allows multiple vehicles to communicate with each other using a predetermined frequency band (e.g., approximately 5.9 GHz) and communication via a dedicated short range communication (DTRC) system.

While vehicle communication and sensing systems are known, such systems lack a capability to identify object attributes such as size and range and alert other receiving vehicles of the data received by a host vehicle. This field can therefore benefit from improved vehicle communication system designs.

SUMMARY

According to several aspects, a motor vehicle system for generating and transmitting detected object attributes includes a communication system module positioned in a host vehicle used to receive vehicle attribute data and prepare a fused object attribute data for transmission to a target vehicle. A vehicle track data sub-module of the communication system module is used to independently track at least one sensed vehicle and the target vehicle. An object detection and classification system module having a 3D object detection module is used to identify a vehicle type of the at least one sensed vehicle and the target vehicle defined at least by a vehicle size and generate an object attribute data. A target fusion module receives the object attribute data from the object detection and classification system module, fuses the object attribute data with the vehicle attribute data to create the fused object attribute data, and forwards the fused object attribute data to the communication system module for transmission.

In one aspect, a decision module is in communication with both the vehicle track data sub-module and the object detection and classification system module, wherein the vehicle attribute data being tracked by the vehicle track data sub-module is compared to the object attribute data generated in the object detection and classification system module.

In another aspect, a track data generator module is provided, wherein when the vehicle attribute data tracked by the vehicle track data sub-module is not coincident with the object attribute data, the vehicle attribute data is communicated directly to the track data generator module where a situational awareness of the vehicle attribute data is monitored.

In another aspect, a message standard module acts to format data from the track data generator module prior to transmission.

In another aspect, a data transfer module transmits the vehicle attribute data to at least the target vehicle.

In another aspect, the object detection and classification system module includes an object classification sub-module acting to distinguish the at least one sensed vehicle from a pedestrian.

In another aspect, the object detection and classification system module includes a stereo matching sub-module to perform stereo imaging of the at least one sensed vehicle and the target vehicle present in a host vehicle predefined sensing and transmission window.

In another aspect, the object detection and classification system module includes an object range map created using distance measurements and tracking computations for each of the at least one sensed vehicle and the target vehicle.

In another aspect, the object detection and classification system module includes a road geometry sub-module wherein the object attribute data from the object range map is compared to a highway geometry provided from a GPS database.

In another aspect, the object detection and classification system module includes a three-dimensional (3D) object detection sub-module wherein the object attribute data is modified to provide 3D geometry for each of the at least one sensed vehicle and the target vehicle.

In another aspect, the object detection and classification system module includes a 3D object track list created for each of the at least one sensed vehicle and the target vehicle.

In another aspect, the object detection and classification system module includes a range estimation sub-module, wherein a distance (range) of the at least one sensed vehicle and the target vehicle with respect to the host vehicle is identified and tracked.

In another aspect, the object detection and classification system module includes an object classification sub-module wherein 3D information identified by the 3D object detection sub-module is compared to a geometry of the at least one sensed vehicle and the target vehicle saved in a memory.

In another aspect, a data modifier module generates coincidences and covariances included with the fused object attribute data.

According to further aspects, a motor vehicle system for generating and transmitting detected object attributes includes a communication system module positioned in a host vehicle used to receive vehicle attribute data from at least one sensed vehicle and prepare object attribute data for transmission to a target vehicle. A vehicle track data sub-module of the communication system module is used to independently track the at least one sensed vehicle and the target vehicle. An object detection and classification system module in communication with the vehicle track data sub-module and having a 3D object detection module is used to identify a vehicle type of the at least one sensed vehicle defined at least by a vehicle size. A decision module is in communication with both the vehicle track data sub-module and the object detection and classification system module, wherein the vehicle attribute data being tracked by the vehicle track data sub-module is compared to the object attribute data generated in the object detection and classification system module. A target fusion module receives the object attribute data from the object detection and classification system module and fuses the object attribute data from the object detection and classification system module with the vehicle attribute data to create the fused object attribute data for transmission to the target vehicle.

In another aspect, the object detection and classification system module includes: a stereo matching sub-module to perform stereo imaging of the at least one sensed vehicle and the target vehicle present in a host vehicle predefined sensing and transmission window; an object range map created using distance measurements and tracking computations for each of the at least one sensed vehicle and the target vehicle; and a road geometry sub-module wherein object attribute data from the object range map is compared to a highway geometry provided from a GPS database.

In another aspect, the object detection and classification system module includes: a 3D object track list created for each of the at least one sensed vehicle and the target vehicle; and a range estimation sub-module for identifying and tracking distances (ranges) of the at least one sensed vehicle and the target vehicle relative to the host vehicle.

In another aspect, the object detection and classification system module includes: an object classification sub-module wherein 3D information identified by the 3D object detection sub-module is compared to a geometry of the at least one sensed vehicle and the target vehicle saved in a memory; and a class confidence sub-module for checking an object classification on a predefined periodic basis to identify a class confidence level.

In another aspect, the object detection and classification system module includes: a range estimation sub-module for identifying and tracking distances (ranges) of the at least one sensed vehicle and the target vehicle relative to the host vehicle; a class confidence sub-module for checking an object classification on a predefined periodic basis to identify a class confidence level; and a pedestrian and vehicle detection sub-module to analyze the information from both the class confidence sub-module and the information from the range estimation sub-module.

According to further aspects, a method for generating and transmitting detected object attributes, comprises: positioning a communication system module in a host vehicle operable to receive vehicle attribute data from at least one sensed vehicle and to prepare a fused object attribute data for transmission to a target vehicle; independently tracking the at least one sensed vehicle and the target vehicle using a vehicle track data sub-module in communication with the communication system module; identifying a vehicle type of the at least one sensed vehicle defined at least by a sensed vehicle size using an object detection and classification system module having a 3D object detection module; fusing the object attribute data from the object detection and classification system module with the vehicle attribute data using a target fusion module to create the fused object attribute data; and transmitting the fused object attribute data to the target vehicle.

Further aspects, examples, and advantages will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
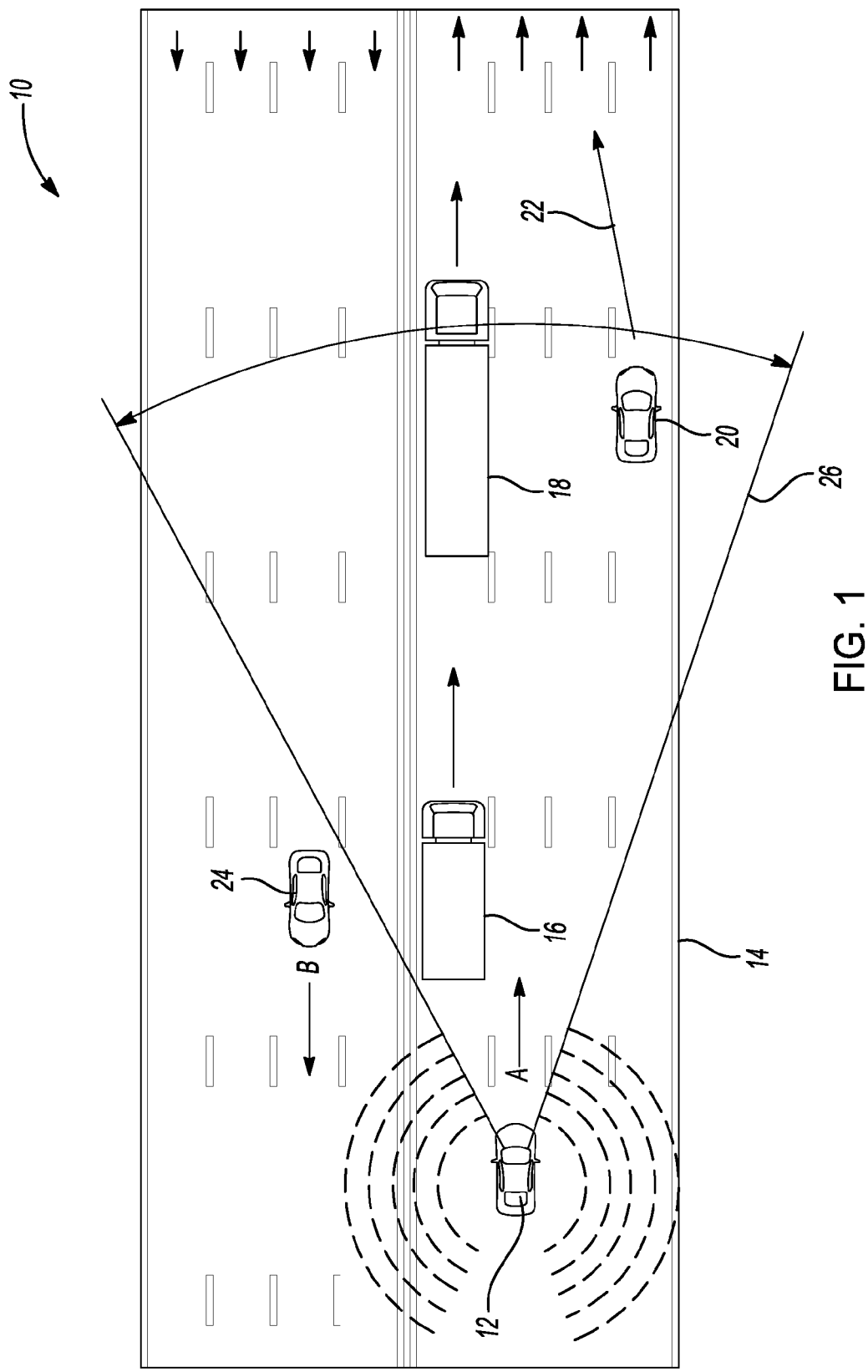
FIG. 1 is a pictorial diagram of a roadway visibility and identification range of a host vehicle using an identification system of the present disclosure.

With reference to FIG. 1, a system and method for providing fused object attribute data to a motor vehicle based on sensed vehicle attributes is generally indicated with reference to identification system 10. Identification system 10 transmits the fused object attribute data from a host vehicle 12 having V2V capability as it travels on a road or highway 14 in a general path of travel "A" to other vehicles also having V2V capability on the highway 14. For example, the host vehicle 12 collects vehicle attribute data from each of a first sensed vehicle 16, a second sensed vehicle 18 and a target vehicle 20 and combines the vehicle attribute data with object attribute data from a database The combined data creates the fused object attribute data. The host vehicle then forwards the fused object attribute data to all vehicles having a V2V communication system, including a target vehicle 20. According to several aspects, at least the host vehicle 12 and the target vehicle 20 are equipped with a V2V communication system.

Figure 3:
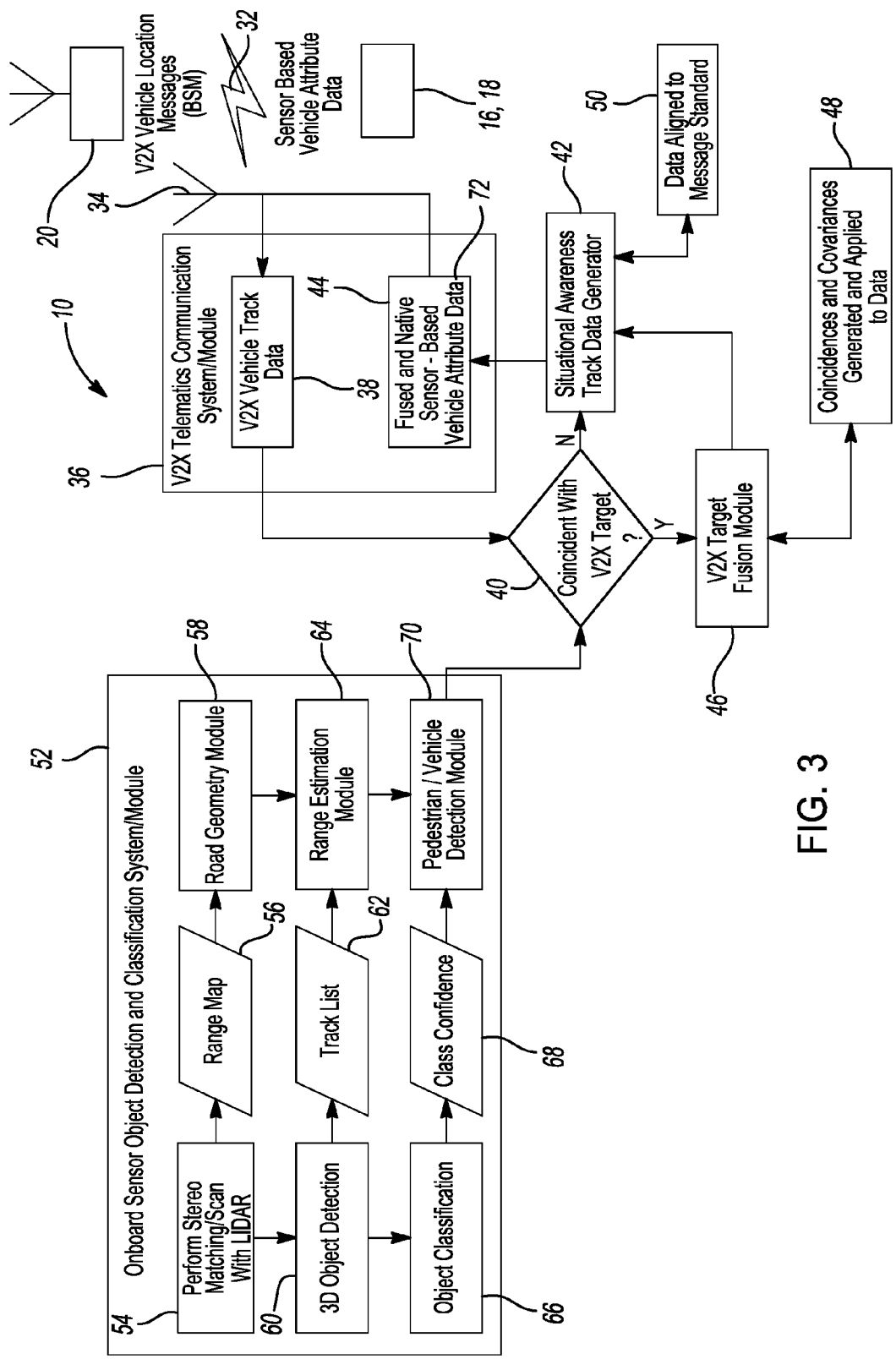
FIG. 3 is a diagrammatic flowchart of the identification system of FIG. 1.

Identification system 10 receives vehicle information as vehicle attribute data from the target vehicle 20, and may receive additional vehicle data from the first sensed vehicle 16 and the second sensed vehicle 18 in an immediate vicinity of the host vehicle 12. In this manner the information may be utilized for Advanced Driver Assist (ADAS) technology by utilizing sensors that are in an existing centralized processor. If the vehicle attribute data is substantially different from object attribute data generated by the host vehicle 12, the identification system 10 combines the vehicle attribute data with the object attribute data to create a fused object attribute data 72 (shown in FIG. 3). The fused object attribute data 72 generated and transmitted by the host vehicle 12 is transmitted across the V2V network including at least to the target vehicle 20. The fused object attribute data 72 can also be received by the first sensed vehicle 16 and the second sensed vehicle 18 if the first sensed vehicle 16 and the second sensed vehicle 18 are also equipped with V2V communication systems.

The fused object attribute data 72 can be, for example, geometric data such as vehicle size, height, and length, as well as trajectory, speed, etc. of the target vehicle 20, and also of the first sensed vehicle 16 and the second sensed vehicle 18. The fused object attribute data 72 is transmitted by the host vehicle 12 to the V2V communication network, and received by the target vehicle 20. The target vehicle 20 can use the fused object attribute data 72 for travel decisions of the target vehicle 20, for example as it changes its path of travel 22. The path of travel 22 can be parallel to the path of travel "A" of the host vehicle 12, or toward or away from the first sensed vehicle 16 or the second sensed vehicle 18. The host vehicle 12 can also transmit the fused object attribute data 72 to any vehicle also equipped with a V2V communication system such as a second target vehicle 24 traveling in a path of travel "B" generally opposite to the path of travel "A" as it traverses a host vehicle predefined sensing and transmission window 26.

Referring to FIG. 2 and again to FIG. 1, in the example shown identification system 10 distinguishes that the first sensed vehicle 16 is a small vehicle such as a passenger car or SUV, and that the second sensed vehicle 18 is a large vehicle such as a semi-truck. Identification system 10 will further distinguish that the target vehicle 20 is a small vehicle such as a passenger car. It is noted these vehicle types and sizes are interchangeable, and are therefore provided as examples only. Data provided from the host vehicle 12 to the target vehicle 20 will identify the other vehicles, such as the second sensed vehicle 18 which may affect the path of travel of the target vehicle 20 as the target vehicle 20 moves for example from a first or outer travel lane 28 to a next lane 30.

Figure 2:
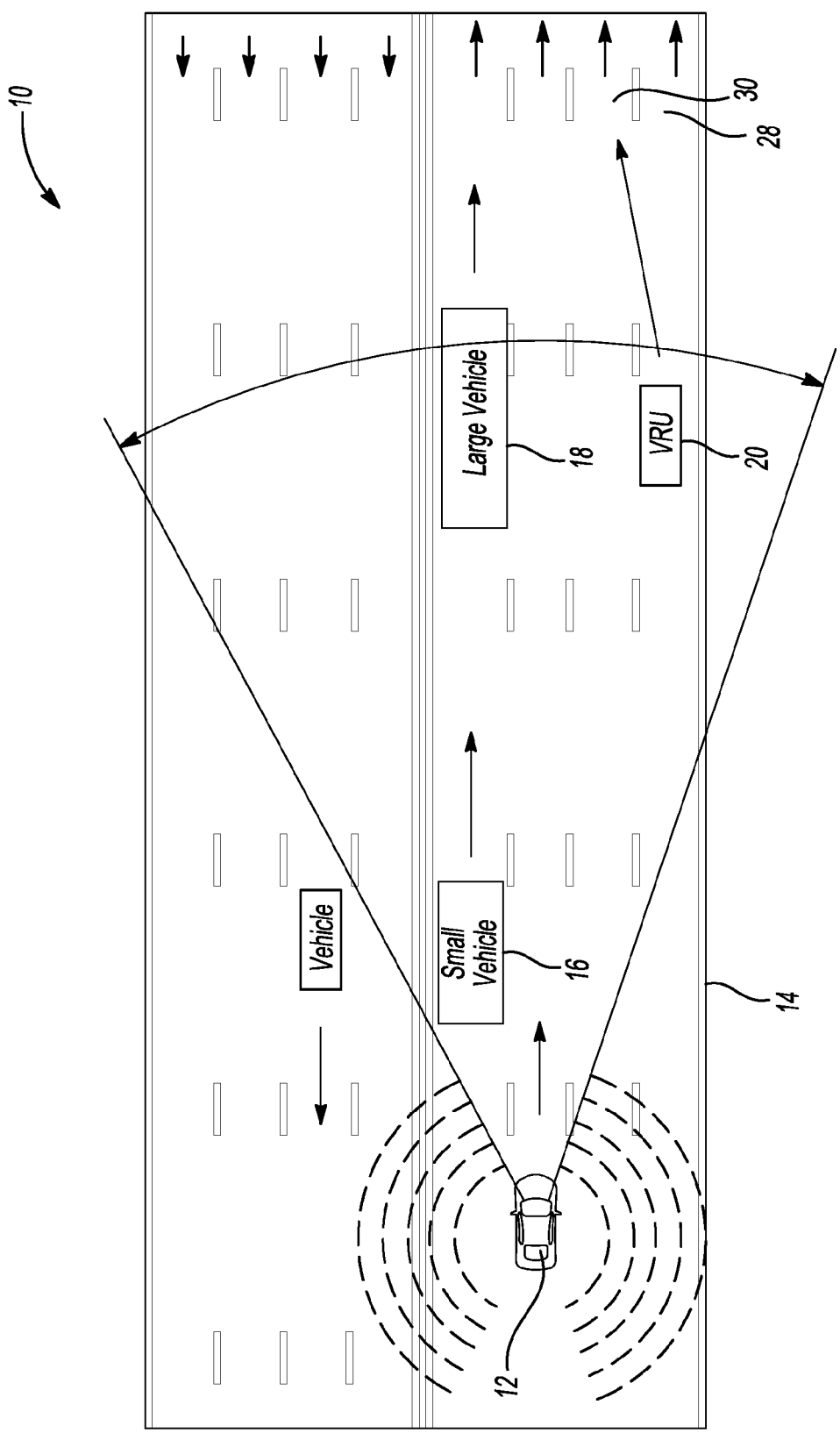
FIG. 2 is a pictorial diagram modified from FIG. 1.

Referring to FIG. 3 and again to FIGS. 1 through 2, according to several aspects, identification system 10 receives vehicle attribute data and can re-transmit the vehicle attribute data if it is substantially unchanged by the analyses performed by the identification system 10, or transmit fused object attribute data 72 in a predefined data format, for example such as Basic Safety Message (BSM) format, which is provided in accordance with SAE J2735 BSM. Vehicle attribute data 32 can include items such as latitude, longitude, time, heading angle, speed, lateral acceleration, longitudinal acceleration, yaw rate, throttle position, brake status, steering angle, headlight status, wiper status, external temperature, turn signal status, vehicle length, vehicle width, vehicle mass, and bumper height. The vehicle attribute data 32 is received via a receiving-transmitting system 34 of the host vehicle 12 such as an antenna system and is communicated to a V2X telematics communication module 36. In the V2X telematics communication module 36, the vehicle attribute data 32 is converted to V2X data format and forwarded to a vehicle track data sub-module 38 of the V2X telematics communication module 36, where the vehicle attribute data 32 for each vehicle within the predefined sensing and transmission window 26 is independently identified and tracked. In a following decision module 40, the vehicle attribute data 32 being tracked by the vehicle track data sub-module 38 is compared to data generated in an object detection and classification system module 52 described in greater detail below.

If the vehicle data received as V2X vehicle message data and being tracked by the vehicle track data sub-module 38 is not coincident with the object attribute data available from the object detection and classification system module 52, and is therefore not significantly different from the data from the object detection and classification system module 52, the program shifts to the track data generator module 42. In the track data generator module 42 a situational awareness of the vehicle attribute data continues to be monitored. From the track data generator module 42, vehicle attribute data is forwarded to a data transfer module 44 from where the vehicle attribute data 32 is transmitted by the receiving-transmitting system 34 of the host vehicle 12 to the V2V network, including to at least the target vehicle 20.

If the vehicle attribute data being tracked by the vehicle track data sub-module 38 is coincident with the object attribute data available from the object detection and classification system module 52, and is therefore significantly different from the data from the object detection and classification system module 52, a target fusion module 46 is applied. In the target fusion module 46 vehicle attribute data from the target vehicle 20 and from both the first sensed vehicle 16 and the second sensed vehicle 18 is fused with object attribute data from the object detection and classification system module 52, defining the fused object attribute data 72. The fused object attribute data 72 is created prior to being forwarded to the track data generator module 42. In the target fusion module 46 the fused object attribute data 72 is created prior to being sent to the track data generator module 42. In a data modifier sub-module 48 of the target fusion module 46 the fused object attribute data 72 is modified to take into account coincidences and covariances. From the target fusion module 46, the fused object attribute data 72 is forwarded to the track data generator module 42 and then to the data transfer module 44 for transmission.

Prior to transmission, the fused object attribute data 72 that has been modified to take into account coincidences and covariances in the data modifier sub-module 48, or vehicle attribute data directly sent to the track data generator module 42, is modified to align with a message standard format, such as BSM message format. Data from the track data generator module 42 can be first formatted for transmission by converting the data in a message standard module 50 prior to being forwarded to the track data generator module 42 for transmission.

The object detection and classification system module 52 is an onboard module of the host vehicle 12 providing multiple sub-modules. The object detection and classification system module 52 performs multiple functions on data received for example from a visual imaging system such as a camera to initially classify a type of vehicle such as a type of the first receiving vehicle 16, the second receiving vehicle 18 and the target vehicle 20. The object detection and classification system module 52 can also distinguish between vehicles and pedestrians. Initially, a system such as LIDAR can be used in a stereo matching sub-module 54 to perform stereo imaging of the various vehicles or objects in the host vehicle predefined sensing and transmission window 26. Distance measurements and tracking computations are then performed for each of the vehicles and objects to create an object range map 56, which is updated at a predetermined interval. Object attribute data from the object range map 56 is then compared to the geometry of highway 14 using data in a road geometry sub-module 58, which can be loaded for example from a known GPS database. The road geometry sub-module 58 can also be used to identify specific travel lanes for each vehicle or object.

Following stereo matching in the stereo matching sub-module 54, object attribute data is evaluated in a three-dimensional (3D) object detection sub-module 60 to identify a 3D geometry for each of the vehicles and objects. From the 3D object detection sub-module 60, a 3D object track list 62 is created for each of the vehicles and objects, and this information is passed through a range estimation sub-module 64, where distances (ranges) of the various vehicles and objects relative to the host vehicle 12 are identified and tracked. Using the 3D information identified by the 3D object detection sub-module 60, the 3D information is then compared in an object classification sub-module 66 to known vehicle and pedestrian geometries saved in a memory. This step identifies each vehicle or object as one of multiple types of vehicles, or identifies if the geometry more closely signifies that a pedestrian is present.

After the initial identification step is completed in the object classification sub-module 66, because the ability to modify the object classification is provided by a stereo data system, the object classification is checked on a predefined periodic basis to identify a class confidence level in a class confidence sub-module 68. The confidence level of the identified vehicle or object can change, for example if the vehicle changes lanes thereby presenting a different view of the vehicle, or if an object originally identified as a large truck resolves as two or more smaller objects. Under this scenario if the identification data now indicates a larger, smaller or different type of vehicle than initially identified, the object classification is changed accordingly.

Following updated classification status checks, the information from the road geometry module 58, the class confidence module 68, and from the range estimation sub-module 64 is together analyzed in a pedestrian and vehicle detection sub-module 70. The output signal from the pedestrian and vehicle detection sub-module 70 identifies the type of vehicle or if the object is a pedestrian, as well as the object's attribute data such as range, direction of travel and velocity. The object attribute data is made available to the decision module 40 to determine if a fused object attribute data signal will be transmitted by the communication system module 36.

According to several aspects, an identification system 10 for generating and transmitting detected object attributes includes a communication system module 36 positioned in a host vehicle 12 which receives vehicle attribute data 32 from at least a target vehicle 20 and a sensed vehicle 16, 18 and transmits object attribute data 72 to at least the target vehicle 20. A vehicle track data sub-module 38 in communication with the communication system module 36 is used to independently track the at least one sensed vehicle 16, 18 and the target vehicle 20. An object detection and classification system module 52 in communication with the vehicle track data sub-module 38 has a 3D object detection module 60 used to identify a vehicle type of the target vehicle and the at least one sensed vehicle 16, 18 defined at least by a vehicle size. A decision module 40 is in communication with both the vehicle track data sub-module 38 and the object detection and classification system module 52. The vehicle attribute data 32 tracked by the vehicle track data sub-module 38 is compared to the object attribute data generated in the object detection and classification system module 52. A target fusion module 46 receives the object attribute data from the object detection and classification system module 52 and fuses the object attribute data from the object detection and classification system module 52 with the vehicle attribute data 32 to create the fused object attribute data 72 for transmission to the target vehicle 20.

The description of the invention is merely exemplary in nature and variations that do not depart from the gist of the invention are intended to be within the scope of the invention. Such variations are not to be regarded as a departure from the spirit and scope of the invention.

The following is claimed:

1. A motor vehicle system for generating and transmitting detected object attributes, comprising:
    a communication system module positioned in a host vehicle receiving vehicle attribute data and preparing a fused object attribute data for transmission to a target vehicle;
    a vehicle track data sub-module of the communication system module used to independently track at least one sensed vehicle and the target vehicle;
    an object detection and classification system module having a 3D object detection module used to identify a vehicle type of the at least one sensed vehicle and the target vehicle defined at least by a vehicle size and to generate an object attribute data; and
    a target fusion module receiving the object attribute data from the object detection and classification system module, fusing the object attribute data with the vehicle attribute data to create the fused object attribute data, and forwarding the fused object attribute data to the communication system module for transmission;
    a decision module in communication with both the vehicle track data sub-module and the object detection and classification system module, wherein the vehicle attribute data is tracked by the vehicle track data sub-module and compared to the object attribute data generated in the object detection and classification system module; and
    a track data generator module, wherein when the vehicle attribute data tracked by the vehicle track data sub-module is not coincident with the object attribute data, the vehicle attribute data is communicated directly to the track data generator module where a situational awareness of the vehicle attribute data is monitored.

2. The system for generating and transmitting detected object attributes of claim 1, further including a message standard module acting to format data from the track data generator module prior to transmission.

3. The system for generating and transmitting detected object attributes of claim 1, wherein the communication system module includes a data transfer sub-module transmitting the vehicle attribute data to at least the target vehicle.

4. The system for generating and transmitting detected object attributes of claim 1, wherein the object detection and classification system module includes an object classification sub-module acting to distinguish the at least one sensed vehicle from a pedestrian.

5. The system for generating and transmitting detected object attributes of claim 1, wherein the object detection and classification system module includes a stereo matching sub-module to perform stereo imaging of the at least one sensed vehicle and the target vehicle present in a host vehicle predefined sensing and transmission window.

6. The system for generating and transmitting detected object attributes of claim 1, wherein the object detection and classification system module includes an object range map created using distance measurements and tracking computations for each of the at least one sensed vehicle and the target vehicle.

7. The system for generating and transmitting detected object attributes of claim 6, wherein the object detection and classification system module includes a road geometry sub-module wherein the object attribute data from the object range map is compared to a highway geometry provided from a GPS database.

8. The system for generating and transmitting detected object attributes of claim 1, wherein the object detection and classification system module includes a three-dimensional (3D) object detection sub-module wherein the object attribute data is modified to provide 3D geometry for each of the at least one sensed vehicle and the target vehicle.

9. The system for generating and transmitting detected object attributes of claim 8, wherein the object detection and classification system module includes a 3D object track list created for each of the at least one sensed vehicle and the target vehicle.

10. The system for generating and transmitting detected object attributes of claim 9, wherein the object detection and classification system module includes a range estimation sub-module, wherein a distance (range) of the at least one sensed vehicle and the target vehicle with respect to the host vehicle is identified and tracked.

11. The system for generating and transmitting detected object attributes of claim 8, wherein the object detection and classification system module includes an object classification sub-module wherein 3D information identified by the 3D object detection sub-module is compared to a geometry of the at least one sensed vehicle and the target vehicle saved in a memory.

12. The system for generating and transmitting detected object attributes of claim 1, further including a data modifier module generating coincidences and covariances included with the fused object attribute data.

13. A motor vehicle system for generating and transmitting detected object attributes, comprising:
    a communication system module positioned in a host vehicle receiving vehicle attribute data from a target vehicle and at least one sensed vehicle and preparing an object attribute data for transmission to the target vehicle;
    a vehicle track data sub-module of the communication system module used to independently track the at least one sensed vehicle and the target vehicle and the vehicle attribute data;
    an object detection and classification system module in communication with the vehicle track data sub-module and having a 3D object detection module used to identify a vehicle type of the target vehicle and the at least one sensed vehicle defined at least by a vehicle size;
    a decision module in communication with both the vehicle track data sub-module and the object detection and classification system module, wherein the vehicle attribute data being tracked by the vehicle track data sub-module is compared to the object attribute data generated in the object detection and classification system module;
    a target fusion module receiving the object attribute data from the object detection and classification system module, fusing the object attribute data from the object detection and classification system module with the vehicle attribute data to create the fused object attribute data, and forwarding the fused object attribute data to the communication system module for transmission; and
    a track data generator module, wherein when the vehicle attribute data tracked by the vehicle track data sub-module is not coincident with the object attribute data, the vehicle attribute data is communicated directly to the track data generator module where a situational awareness of the vehicle attribute data is monitored.

14. The system for generating and transmitting detected object attributes of claim 13, wherein the object detection and classification system module includes:
    a stereo matching sub-module to perform stereo imaging of the at least one sensed vehicle and the target vehicle present in a host vehicle predefined sensing and transmission window;
    an object range map created using distance measurements and tracking computations for each of the at least one sensed vehicle and the target vehicle; and
    a road geometry sub-module wherein object attribute data from the object range map is compared to a highway geometry provided from a GPS database.

15. The system for generating and transmitting detected object attributes of claim 13, wherein the object detection and classification system module includes:
    a 3D object track list created for each of the at least one sensed vehicle and the target vehicle; and
    a range estimation sub-module for identifying and tracking distances (ranges) of the at least one sensed vehicle and the target vehicle relative to the host vehicle.

16. The system for generating and transmitting detected object attributes of claim 13, wherein the object detection and classification system module includes:
    an object classification sub-module wherein 3D information identified by the 3D object detection sub-module is compared to a geometry of the at least one sensed vehicle and the target vehicle saved in a memory; and
    a class confidence sub-module for checking an object classification on a predefined periodic basis to identify a class confidence level.

17. The system for generating and transmitting detected object attributes of claim 13, wherein the object detection and classification system module includes:
    a range estimation sub-module for identifying and tracking distances (ranges) of the at least one sensed vehicle and the target vehicle relative to the host vehicle;
    a class confidence sub-module for checking an object classification on a predefined periodic basis to identify a class confidence level; and
    a pedestrian and vehicle detection sub-module to analyze the information from both the class confidence sub-module and the information from the range estimation sub-module.

18. A method for generating and transmitting detected object attributes, comprising:
    positioning a communication system module in a host vehicle receiving vehicle attribute data from a target vehicle and at least one sensed vehicle and preparing a fused object attribute data for transmission to the target vehicle;
    independently tracking the target vehicle and the at least one sensed vehicle using a vehicle track data sub-module of the communication system module;
    identifying a vehicle type of the at least one sensed vehicle defined at least by a vehicle size using an object detection and classification system module having a 3D object detection module;
    placing a decision module in communication with both the vehicle track data sub-module and the object detection and classification system module, wherein the vehicle attribute data is tracked by the vehicle track data sub-module and compared to the object attribute data generated in the object detection and classification system module;
    when the vehicle attribute data is not coincident with the object attribute data, communicating the vehicle attribute data directly to the track data generator module where a situational awareness of the vehicle attribute data is monitored;
    fusing the object attribute data from the object detection and classification system module with the vehicle attribute data using a target fusion module to create the fused object attribute data; and transmitting the fused object attribute data to the target vehicle.

* * * * *